R. D. WINSHIP.
AERATING AGITATOR FOR LIQUIDS.
APPLICATION FILED NOV. 11, 1907.
932,221.
Patented Aug. 24, 1909.
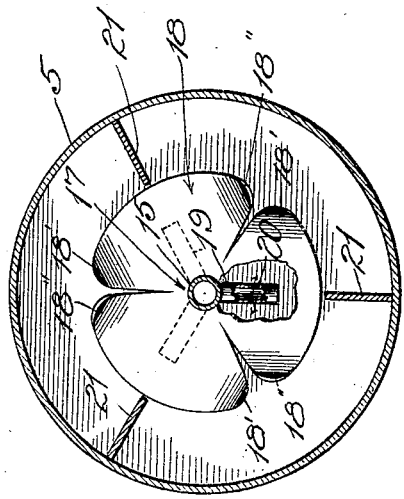
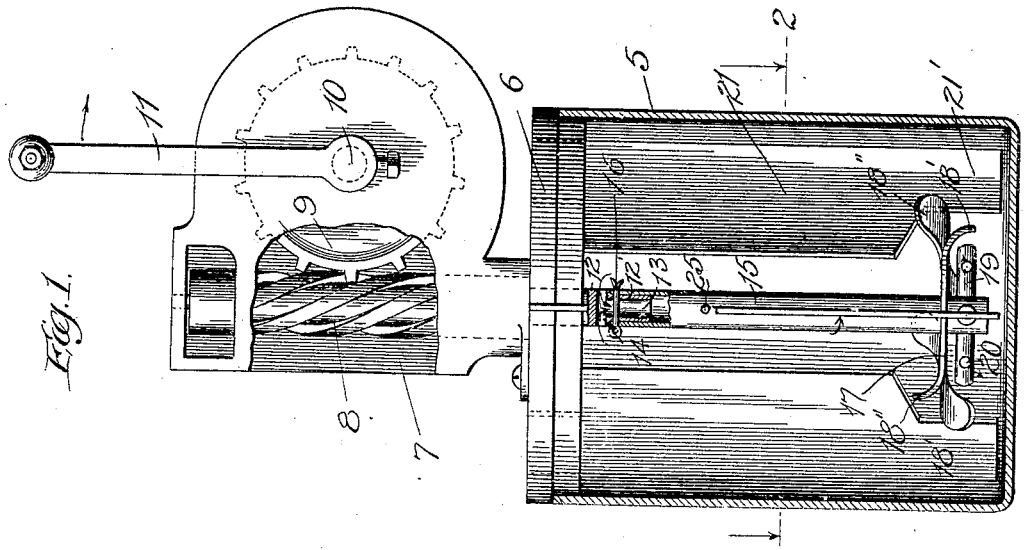

UNITED STATES PATENT OFFICE.

RICHARD DARYAC WINSHIP, OF CHICAGO, ILLINOIS.

AERATING AGITATOR FOR LIQUIDS.

932,221.  Specification of Letters Patent.  Patented Aug. 24, 1909.

Application filed November 11, 1907.  Serial No. 401,586.

*To all whom it may concern:*

Be it known that I, RICHARD DARYAC WINSHIP, a citizen of the United States, residing at Chicago, in the county of Cook and State of Illinois, have invented certain new and useful Improvements in Aerating Agitators for Liquids, of which the following is a specification.

My invention relates to improvements in aerating agitators for liquids, and has for its primary object to provide a simple and efficient mechanism for violently agitating and simultaneously aerating a liquid body.

Other objects will become apparent to those skilled in the art from the following description taken in conjunction with the accompanying drawings, wherein I have illustrated an operative embodiment of my invention.

Figure 1 is a side elevation with parts in section of an embodiment of my invention equipped with devices adapting it for the churning of milk to produce butter. Fig. 2 is a transverse section on line 2—2 of Fig. 1.

Throughout the several views like numerals of reference refer always to like parts.

In the drawings, 5 indicates a suitable receptacle, preferably of cylindrical form, provided with a removable cover or cap 6, whereon is mounted a fitting 7, preferably a metallic casting, providing bearings and a housing for a vertical worm shaft 8 and a worm wheel 9 meshing therewith and mounted on a transverse shaft 10, whereto is also secured an operating handle 11.

The lower end of the shaft 8 is somewhat reduced as shown at 12, and projects through the cover 6 into the interior of the casing, the extremity of the portion 12 being again reduced as shown at 12' to receive the hollow shaft to be described. The reduced portions 12 and 12' of the shaft 8 are provided with an axial duct 13 with which communicate transverse openings 14. 15 indicates a hollow shaft seated upon the reduced portion 12' of the worm shaft and at its upper end abutting against the shoulder formed between the parts 12, 12' of the worm shaft, said hollow shaft being held in position by a transverse pin 16, or the like, passing through such parts in suitable manner for easy removal. The lower extremity of the shaft 15 approaches the bottom of the receptacle and is provided with an agitator, generally indicated as 17.
Specifically I prefer that the agitator 17 be constructed as a metallic disk radially slit to form a suitable plurality of blades, preferably three or more, each blade having one peripheral corner or end down-turned as at
18' and its other end up-turned as at 18''.
Below the blades of the agitator 17 are arranged a series of distributing pipes 19, radially secured to and communicating with the interior of the hollow shaft 15, and preferably arranged one beneath each blade of the agitator, each such distributing pipe 19 having made therein in suitable positions air escape openings 20, opening laterally from the pipes. It will be observed that the pipes 19 are arranged between the level of the middle of the blades and the level of the downturned ends 18' thereof.

For use of the device as a churn I provide, peripherally beyond and also above the path of rotation of the agitator obstruction herein shown as radial walls 21, removably seated and supported in slots made therefor in the cover 6 and extending downward from the top of the receptacle to a plane close to or coincident with the bottom thereof. Each wall 21, throughout its portion above the plane of the agitator 17 is preferably of such width as to partially overlie such agitator, but the lower part of the wall, as indicated at 21' is reduced or cut away to give clearance for the activity of the agitator and lie wholly without its path of rotation.

In the operation of the machine above described as a churn the cream is introduced into the casing to a proper level and then the handle 11 is rotated; its gearing connections 9 imparting rotation at a higher rate through the vertical shaft and the agitator 17 carried thereby, the direction of rotation of the shaft being such that the downturned end of each precedes the upturned end. Thus the fluid in the receptacle is violently agitated, bodies thereof being forcibly projected, always in an upward direction, and as a further result of the rotation of the shaft centrifugal effect causes the current of air to flow down through the shaft, entering the tubular portion 15 through the openings 14 and 13, the air being ejected into the fluid undergoing agitation through the air opening 19, at points beneath the blade where there is a tendency to the creation of a partial vacuum owing to the lifting action of the propeller-like agitator. By this means copious and efficient aeration of the agitated fluid is effected, and the agitation and air distribution are made the more effective for churning purposes by the arrangement of obstruction walls 21, which prevent the fluid mass as a whole from acquiring a rotary motion, tending to neutralize the effect of the agitator action. It will be apparent that the provision of the obstruction walls 21 in manner shown breaks up the whirl of the fluid, in the plane of the agitator outside of its path of motion, and in higher planes, both coincident with and surrounding the path of the agitator.

I have found by experience that the agitation produced by the mechanism described is so violent and the aeration so complete that butter churning operations may be accomplished in a very short space of time with a very low expenditure of energy in the churning. I find, however, that for some purposes where aeration and agitation are desirable it is preferable not to obstruct the rotation of the fluid, and for such work the walls 21 may obviously be removed.

While I have herein described in some detail a specific embodiment of my invention, it will be apparent to those skilled in the art that numerous changes may be made in the mechanical construction without departure from the spirit and scope of the invention.

Having thus described my invention, what I claim and desire to secure by Letters Patent, is;

In an aerating agitator, the combination with an inclosing casing, a removable cover therefor, arranged to partly enter the casing and to overlie the top edge thereof, a two-part hollow shaft, detachably secured together by means of a cotter pin, the upper shaft section provided with a transverse perforation immediately below the cover, radial pipes, having laterally disposed openings, communicating with the lower end of the hollow lower shaft section, and an agitator above said transverse pipe arranged to lift the liquid contents of the casing when rotated and a means for rotating said sectional shaft, substantially as described.

In testimony whereof I hereunto set my hand in the presence of two witnesses.

RICHARD DARYAC WINSHIP.

In the presence of—
GEO. T. MAY, Jr.,
MARY F. ALLEN.